United States Patent Office 2,808,086
Patented Oct. 1, 1957

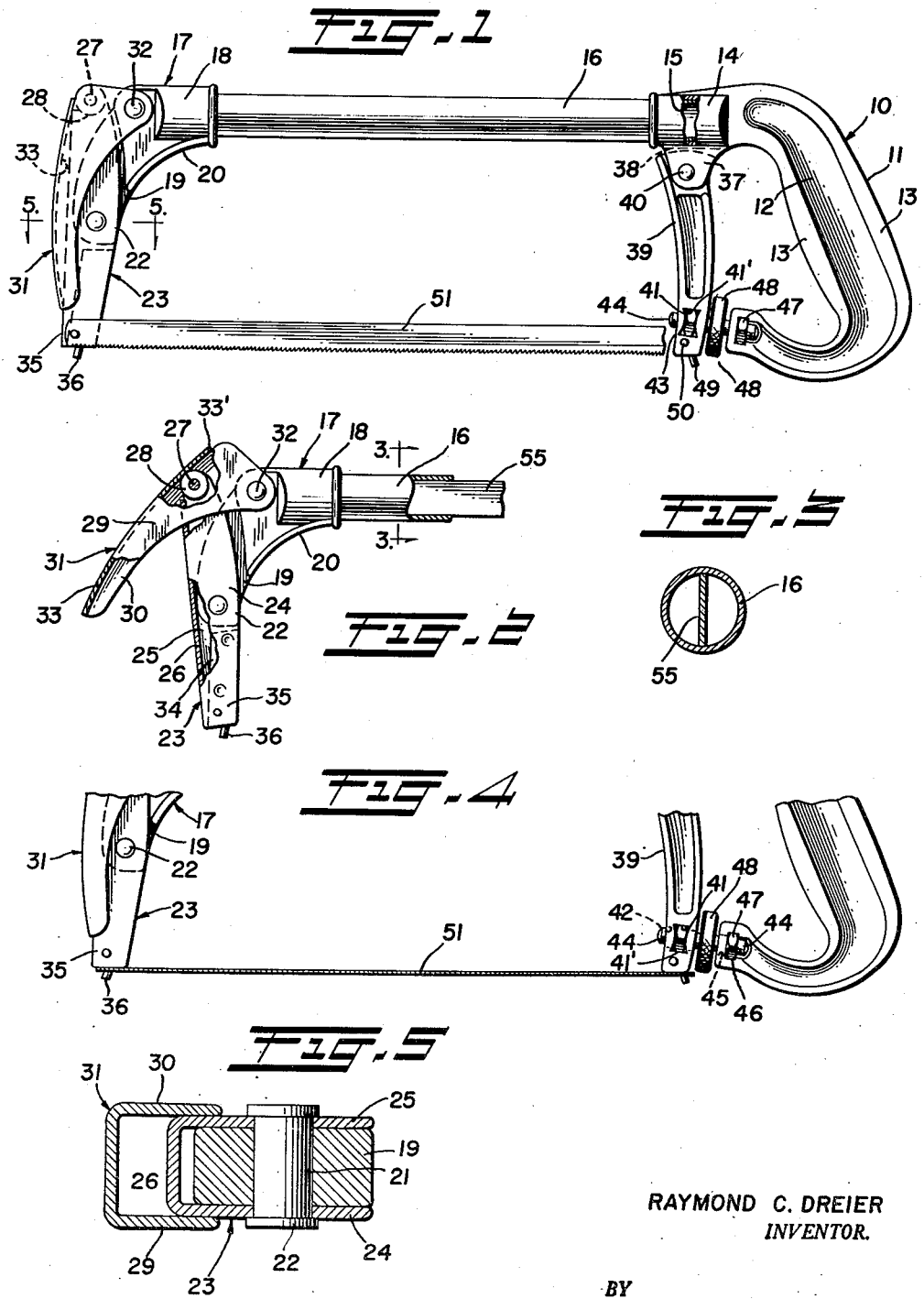

2,808,086

HAND-SAW CONSTRUCTION

Raymond C. Dreier, Chicago, Ill., assignor to Dreier Brothers, Inc., Chicago, Ill., a corporation of Illinois Application July 8, 1955, Serial No. 520,683

7 Claims. (Cl. 145—33)

The present invention relates to hand-saws and particularly to a highly improved hand-saw of the kind having a longitudinally extending frame for removably receiving and tensioning a saw blade, the present invention being especially useful in saws of the hack-saw type.

One of the objects of the present invention is to provide a relatively inexpensive hand-saw having a longitudinally extending frame and having improved means at the opposite ends thereof for receiving and conveniently tensioning a saw blade. Another object of the invention is to provide a saw of this type having a compound lever movement at its forward end whereby a saw blade may be quickly tensioned merely by the movement in one direction of a manually operated lever, and whereby the tension in the blade may be quickly released to permit easy removal of the blade merely by moving the lever in the opposite direction. Still another object of the invention is to provide in said compound lever structure means providing an over-center relationship between the levers for locking the lever structure in a blade tensioning position. Yet a further object of the invention is to provide at the rear end of the saw simplified and easily operated means for selectively varying the tension produced in the saw blade by operation of the compound lever structure. Still another object of the invention is to provide in the saw frame a principal longitudinally extending hollow tubular frame member reinforced in a novel manner to prevent the tubular member from buckling or flexing substantially in the plane of the saw when the saw blade is tensioned, thereby permitting the tubular member to be lighter in weight than would ordinarily be the case, and consequently reducing the weight of the saw.

These and other objects and advantages of the present invention will be apparent from the following description of a preferred embodiment thereof taken with the accompanying drawing wherein:

Fig. 1 is an elevational side view of a hand-saw embodying the present invention, showing the parts of the saw in their normal operative positions, wherein the blade of the saw is tensioned and ready for use;

Fig. 2 is a fragmentary elevational view of the forward or left-hand end portion of the saw, as seen in Fig. 1, certain portions of the saw structure being shown in cross-section and certain mechanical parts of the saw being illustrated in their open or blade tension relieving position, with the saw blade removed;

Fig. 3 is an enlarged vertical cross-section of the longitudinally extending frame member of the saw, taken substantially along the line 3—3 in Fig. 2;

Fig. 4 is a fragmentary elevational side view of the lower portion of the saw, showing the blade of the saw mounted in an alternate position; and Fig. 5 is an enlarged cross-sectional view taken substantially along the line 5—5 in Fig. 1.

In the drawing the numeral 10 designates a substantially C-shaped handle having a grip portion 11 formed thereon so as to fit nicely in the hand. The central portion of the body of the handle is of reduced thickness, to reduce the weight of the handle, and in effect comprises a web 12 integrally joined with a laterally directed flange 13 that extends around the entire perimeter of the handle and generally defines its outer contour. Integrally formed upon the upper end of the handle there is a substantially cylindrical boss 14 having a cavity 15 formed therein in which there is received one end of a hollow cylindrical tubular frame member 16 that extends longitudinally of the saw, the rear end of the tubular frame member being secured within the cavity 15 of the boss 14 by press-fitting or as by silver soldering or the like. The opposite end of the tubular frame member 16 is provided with an outer frame element or bracket 17, the bracket having a substantially cylindrical boss 18 formed thereon within which the forward end of the tubular member 16 is received and secured in the same manner that its other end is secured within the boss 14 of the handle. The bracket 17 has a forwardly and downwardly curved finger 19 formed integrally thereon and, if desired, this finger and the bracket may be reinforced on the underside by a laterally extending flange 20.

A transverse opening 21 (Fig. 5) is provided through the finger 19 adjacent its lower end, and a rivet or pin 22 extends through the opening and has pivotally mounted thereon an intermediate lever assembly 23, the body of the intermediate lever assembly being substantially U-shaped in cross-section and having a pair of side walls 24 and 25 joined by an end wall 26. As best seen in Fig. 5, the side walls 24 and 25 lie along the opposite sides of the finger 19 of the bracket 17, the finger being of a thickness such that its presence between the side walls 24 and 25 of the intermediate lever assembly tends to strengthen the lever assembly and tends to prevent any buckling thereof, but at the same time permits the lever assembly to pivot upon the rivet 22. The front wall 26 of the intermediate lever assembly 23 is interrupted adjacent the upper end of the lever where the side walls 24 and 25 extend upwardly to provide a pair of ears between which there is mounted a pin 27 having a roller 28 rotatably mounted thereon between the ears. This roller and the forward and upper portion of the intermediate lever assembly 23 are disposed between two rearwardly directed spaced apart ears formed integrally with the two side walls 29 and 30 of an outer lever designated generally by the numeral 31. The two side walls of the outer lever 31 are preferably of the curved contour shown in the drawing and at their upper ends the rearwardly directed ears thereon are pivotally mounted on opposite sides of the bracket 17, to the rear of the lever assembly 23, by means of a rivet 32 extending through the bracket 17 adjacent the boss 18 thereon. The side walls 29 and 30 of the outer lever 31 are joined along their forward edges by a web 33 which is curved longitudinally, as best seen in Fig. 2, the roller 28 being adapted to roll along the inner surface of this web.

At the lower end of the intermediate lever assembly 23 a steel block 34 is spot welded or otherwise secured between the side walls 24 and 25, the lower end of the block preferably being coincident with the lower end of the lever. A pair of saw blade receiving pins are fixed in this block. One of the pins 35 extends laterally from the block through the side wall 24 of the intermediate lever and the other pin 36 extends downwardly and slightly forwardly from the lower end of the block.

The upper end of the handle 10 has a pair of depending ears 37 formed thereon, the two ears being separated by a vertical slot designated by the numeral 38. This slot receives the upper end of a blade mounting link 39 which is pivotally mounted upon a rivet 40 extending transversely through the ears 37 and the intermediate slot 38. This link adjacent its lower end is provided with a transverse through-slot 41 and a cylindrical passage 42 (Fig. 4) extending forwardly and slightly upwardly through the lever, the cylindrical passage intersecting the transverse slot 41 at right angles. The transverse slot has loosely located therein a hexagonal nut 43, the dimensions of the slot being such that a pair of the opposite peripheral walls of the nut loosely engage the top and bottom walls of the slot to prevent rotational movement of the nut about its axis, while the side or end walls 41' of the slot prevent longitudinal movement of the nut in an axial direction. It will be noted however that the side or end walls 41' of the slot 41 are convex, thereby permitting limited tilting movement of the nut within the slot. The reason for this is explained below.

A shaft 44, having one end very loosely extending through the cylindrical passage 42, is threaded into the nut 43 and extends from the link 39 rearwardly, where the rearwardmost end of the shaft is very loosely received within a cylindrical opening 45 formed in the lower end of the handle 10 in a position substantially coaxial with the corresponding cylindrical passage 42 in the link 39. Like the lower end of the link 39, the handle 10 has a transverse slot 46 formed therein intersecting the cylindrical opening 45 substantially at right angles and has located therein another hexagonal nut 47. The transverse slot 46, like the transverse slot 41 in the link 39, is of a size such as to prevent rotation of the nut 47 as well as to prevent axial movement of the nut. The nuts 43 and 47 are provided with oppositely directed threads. That is to say, the nut 43 may be provided with right-hand threads corresponding to the threads on the forward end of the shaft 44, while the nut 47 is provided with left-hand threads. As shown in the drawing, the rearward end of the shaft 44 is threadily received within the nut 47 and, when the thread directions of the two nuts are as just stated, the threads provided on the rearward end of the shaft will be left-hand threads to correspond to those of the nut 47.

At the approximate longitudinal center of the shaft 44 there is fixed upon the shaft a cylindrical knurled finger adjusting member 48, the rotation of which will cause the shaft 44 to rotate in the nuts 43 and 47, thereby pivoting the link 39 with respect to the handle 10. The lowermost end of the link 39 is provided with a downwardly and slightly rearwardly directed blade receiving pin 49, and a similar blade receiving pin 50 projects laterally from the lower portion of the link.

As shown in the drawing, an ordinary hack-saw blade 51 may be received upon the blade mounting pins 35 and 50 in the position shown in Fig. 1, wherein the blade is disposed substantially parallel to the plane of the saw frame. The blade likewise may be mounted upon the pins 36 and 49, as shown in Fig. 4, wherein the plane of the blade is disposed substantially normal to the plane of the saw frame. When a blade is to be installed upon the saw in either of these positions, the outer lever 31 at the forward end of the saw is gripped in the fingers and pivoted outwardly about the rivet 32 to the position shown in Fig. 2, thereby permitting free counter-clockwise rotation of the intermediate lever assembly 23 about the rivet 22 to the position shown in Fig. 2. This movement of the intermediate lever carries the blade receiving pins on its lower end toward the handle 10 to permit quick and easy installation of the saw blade upon either the pins 35 and 50 or the pins 36 and 49. When the saw blade has been installed upon the selected pair of pins, the entire outer end of the saw may be conveniently gripped in the hand, with the palm of the hand or the fingers engaging the outer surface of the web 33 of the outer lever 31, whereupon the hand is squeezed to pivot the outer lever in a clockwise direction, as viewed in the drawing, from the position illustrated in Fig. 2 toward the position shown in Fig. 1. This pivotation of the outer lever causes the inner surface of its web 33 forcefully to engage the roller 28 at the upper end of the intermediate lever 23, thereby providing force upon the intermediate lever 23 causing it to be rotated in the clockwise direction to tighten the saw blade, the roller 28 rolling upwardly along the inner surface of the web 33 of the outer lever 31 during this operation. As the parts of the saw at its outer end approach their normal closed position illustrated in Fig. 1, the roller 28 reaches the upper end 33' of the web 33. Upon final closing movement of the lever 31 the lowermost edge of its web 33 comes into contact with the forward surface of the web 26 of the intermediate lever assembly 23, and in this same final closing movement the axis of the roller 28 moves through an imaginary line extending from the upper edge 33' of the web 33 to the axis of the pivot pin or rivet 32. This slight movement of the axis of the roller beyond the end 33' of the web 33 is an over-center movement which locks the levers in their normal closed or blade tensioning positions.

With the parts of the saw at its outer end in the blade tensioning position shown in Fig. 1, the tension in the saw blade may be adjusted by rotation of the knurled finger member 48. If the tension in the saw blade is less than desired, as for example if the blade 51 is slightly longer than the blade previously installed, the finger member 48 is rotated in a direction to pivot the blade adjusting link 39 toward the handle, thereby further tightening the blade. On the other hand, if difficulty is experienced in moving the parts of the saw at its forward end to the closed position, or if the tension in the blade 51 appears to be execessive when the parts have reached this closed position, as would be the case if the blade is slightly shorter than the preceding one, the knurled finger member 48 is rotated in the opposite direction to decrease the tension in the blade. Thus, it will be understood that when successive blades installed in the saw frame are of identical length, their installation may be made in a very minimum of time simply by operation of the lever 31 on the forward end of the saw. To remove a blade, the lever 31 is pulled forwardly from the position shown in Fig. 1 to the position illustrated in Fig. 2. As previously explained, this releases the intermediate lever assembly 23, permitting its rotation to relieve the tension in the blade and thereby permit the blade to be lifted from the mounting pins 35 and 50 or 36 and 49, as the case may be. With the old blade removed, a new blade is installed with equal ease by placing it upon the selected blade receiving pins and thereupon returning the lever 31 from the position shown in Fig. 2 to the blade tensioning position seen in Fig. 1. As explained above, this movement pivots the intermediate lever 23 in the clockwise direction carrying its lower end forwardly with respect to the frame to tighten the blade, the over-center movement at the end of the stroke of the levers causing the levers to be retained or locked in their blade tensioning position.

It will be understood however that, despite the most careful production controls, saw blades have slight differences in the actual distances between the pin receiving openings at their opposite ends, and it will also be understood that it would be substantially impossible, as a purely practical matter, to mass produce saws of the present type having precisely the same distance between blade receiving pins in all saws, unless adjustments were provided. Accordingly, when a blade has been installed in the present saw in the manner just described, the finger operated member 48 may be rotated to pivot the link 39 slightly toward or away from the handle 10 to adjust the tension in the blade as required. When this adjustment has once been made, no further adjustment is necessary when the same blade is moved alternately between the blade mounting positions shown in Figs. 1 and 4, or when another blade of exactly the same length is installed in the saw.

It will be noted that the present saw is graceful in its lines and very compact in its structure, the levers at its forward end nesting in each other and providing a compact and nicely rounded assembly which may be comfortably gripped in the hand while the saw is being operated in the manner common to hack-saws. It will also be noted that the present saw may be of relatively light weight in construction, the levers 23 and 31 comprising stamped parts, if desired, and the principal longitudinal frame member 16 being a hollow cylindrical tube. As shown in the drawing, this tubular member is reinforced in an inexpensive and highly effective manner by a vertical planar web member 55 which is drawn or pulled into the interior of the tube before the handle 10 and bracket 18 are installed on the tube. The width of the metal strip which comprises this web is slightly greater than the normal interior diameter of the tubing material from which tube 16 is cut, so that as the web is forcefully pulled into the tube, its upper and lower edges wedge tightly against the opposite interior surfaces of the tube, no other fastening means being employed between the web 55 and the tube 16. The web extends along the entire length of the tube and the interior curvature of the tube prevents lateral movement or flexure of the web with respect to the tube. Furthermore, when the handle 10 and the bracket 17 are installed at the opposite ends of the tube, they are located so that the plane of the saw and the plane of the web coincide, as shown in the drawings. This arrangement of the web 55 in the plane of the saw provides the tube 16 with excellent beam strength in the plane of the saw, thereby permitting very high tension in the blade 51 without danger of buckling the tubular frame member.

It has previously been mentioned that the forward and rear walls 41' of the transverse slot 41 in the pivoted link 39 are slightly convex to permit a certain amount of tilting movement of the nut 43 located therein. This freedom of movement of the nut, or its equivalent, is needed to prevent binding when the finger operated member 48 is rotated to pivot the link 39, inasmuch as the general angle between the link and the axis of the shaft 44 changes slightly during the pivotation of the link.

The foregoing description of one embodiment of the present invention has been given for clearness of understanding only and no unnecessary limitations are intended thereby, for it will be apparent to those skilled in the art that numerous variations and modifications may be made in the saw within the spirit and scope of the appended claims.

I claim:

1. A hand-saw comprising, a longitudinally extending saw frame including a downwardly directed handle at the rear end of said frame, a depending link pivotally mounted at its upper end upon said frame forwardly of said handle, adjustable means interconnecting said link with said handle, means at the lower end of said link for securing thereto the rear end of a saw blade, a first lever assembly pivotally mounted intermediate its ends upon the forward end portion of said frame, said first lever assembly having a downwardly extending lower end portion, means on said lower end portion of said first lever assembly for securing thereto the forward end of said saw blade, a second lever pivotally mounted upon said forward end portion of said frame in abutting engagement with the upper portion of said first lever assembly, said second lever being pivotally movable forcefully against said upper portion of said first lever assembly to pivot said first lever assembly in a direction wherein said lower portion thereof is moved forwardly with respect to said frame to a blade tensioning position, and means for retaining said first lever assembly in said blade tensioning position, said adjustable means interconnecting said link and said handle being selectively operative to pivot said link toward and away from said handle to vary the tension in said blade.

2. In a hand-saw having a longitudinally extending frame and downwardly extending means adjacent the rear thereof for anchoring the rear end of a saw blade, the combination comprising, an upstanding first lever pivotally mounted intermediate its ends upon the forward end portion of said frame, means at the lower end of said first lever for securing thereto the forward end of said saw blade, a roller rotatably mounted upon said first lever adjacent the upper end thereof, a second lever having an upwardly directed arm disposed forwardly of said first lever, said arm having at its upper end a pair of rearwardly extending spaced apart ears straddling the upper portion of said first lever and pivotally mounted upon said forward end portion of said frame rearwardly of said first lever, and a surface on said arm engaging and riding upon the forwardly directed surface of said roller, said second lever and said arm thereon being pivotable about said forward end portion of said frame to cause said surface on said arm to bear forcefully upon said roller to pivot said first lever in a direction carrying the lower end of said first lever forwardly with respect to said frame, thereby tensioning said saw blade.

3. The combination set forth in claim 2, wherein said roller engaging surface on said arm terminates in an edge substantially parallel to the axis of said roller and said axis of said roller passes through an imaginary line between said edge and the pivotal axis of said second lever during the pivotation of said levers to tension said blade, movement of said axis through said line comprising an over-center movement locking said levers in blade tensioning position.

4. In a hand-saw having a longitudinally extending frame member and downwardly extending means adjacent the rear thereof for removably receiving and anchoring the rear end of a saw blade, the combination comprising, a bracket fixed upon the forward end of said frame member and having a forwardly and downwardly directed finger thereon, an upstanding first lever pivotally mounted intermediate its ends upon the lower portion of said finger, said lever being substantially U-shaped in transverse section with spaced apart side walls receiving said lower portion of said finger therebetween, means adjacent the lower end of said first lever for removably securing thereto the forward end of said saw blade, a roller rotatably mounted between said side walls of said first lever adjacent the upper end of said lever, a second lever having an upwardly directed arm disposed forwardly of said first lever, said arm having at its upper end a pair of rearwardly extending spaced apart ears straddling the upper portion of said first lever including said roller and pivotally mounted upon the forward end portion of said frame rearwardly of said first lever, and a surface on said arm engaging and riding upon the forwardly directed surface of said roller, said second lever and said arm thereon being pivotable about said forward end portion of said frame to cause said surface on said arm to bear forcefully upon said roller to pivot said first lever in a direction carrying the lower end of said first lever forwardly, thereby tensioning said saw blade.

5. A hand-saw comprising, a longitudinally extending saw frame including a downwardly directed handle at the rear end of said frame, a depending link pivotally mounted at its upper end upon said frame forwardly of said handle, a rotatable shaft having threads of opposite hand on its respective ends, means on said link and said handle respectively threadably receiving said opposite ends of said shaft, said shaft thereby interconnecting said link and said handle, means at the lower end of said link for securing thereto the rear end of a saw blade, a first lever assembly pivotally mounted intermediate its ends upon the forward end portion of said frame, said first lever assembly having a downwardly extending lower end portion, means on said lower end portion of said first lever assembly for securing thereto the forward end of said saw blade, a second lever pivotally mounted upon said forward end portion of said frame in abutting engagement with the upper portion of said first lever assembly, said secind lever being pivotally movable forcefully against said upper portion of said first lever assembly to pivot said first lever assembly in a direction wherein said lower portion thereof is moved forwardly with respect to said frame to a blade tensioning position, and means for retaining said first lever assembly in said blade tensioning position, said shaft being selectively rotatable to pivot said link toward and away from said handle to vary the tension of said blade.

6. A hand-saw comprising, a longitudinally extending saw frame including a downwardly directed handle at the rear end of said frame, an upright link pivotally mounted at its upper end upon said frame and extending downwardly therefrom forwardly of said handle, said link and said handle each having in the lower portion thereof a passage extending substantially longitudinally of said saw, said passages being in substantial alignment with each other and each having an open end opposite the open end of the other, said link and said handle each also having therein a transverse slot intersecting the respective passages, a rotatable shaft having its respective opposite ends loosely disposed in said passages, oppositely directed threads on the respective ends of said shaft, means retained in said slots and engaging said threads, means at the lower end of said link for securing thereto the rear end of a saw blade, and means on the forward end portion of said frame for anchoring the forward end of said blade, said shaft being selectively rotatable in said passages and in contact with said thread engaging means to pivot said link toward and away from said handle to vary the tension of said blade, at least one of said thread engaging means being loosely retained in its respective slot so as to prevent binding of said shaft when said link is pivoted with respect to said handle.

7. A hand-saw comprising, a longitudinally extending hollow tubular frame member having a downwardly extending handle on one of its ends, said handle and said frame member defining the longitudinal plane of said saw, a bracket fixed upon the other end of said frame member and extending downwardly therefrom in said plane of said saw, a longitudinally extending substantially planar web member disposed in the interior of said tubular frame member and in the plane of said saw, said web member having longitudinally extending upper and lower edges wedged respectively against the upper and lower interior walls of said tubular frame member, thereby reinforcing said frame member against flexure in said plane of said saw, an upstanding lever assembly pivotally mounted intermediate its ends on said bracket, means on the lower end portion of said lever assembly for securing thereto the forward end of a saw blade, means for anchoring the opposite end of said saw blade to said handle, a second lever pivotally mounted on said bracket and in abutting engagement with the upper end portion of said lever assembly, said second lever being movable forcefully against said upper end portion of said lever assembly to pivot said lever assembly in a blade tensioning direction, and means for retaining said lever assembly in a blade tensioning position.

References Cited in the file of this patent

UNITED STATES PATENTS

| | | |
|---|---|---|
| 257,802 | Woodrough | May 9, 1882 |
| 579,492 | Morrell | Mar. 23, 1897 |
| 1,840,925 | Welch | Jan. 12, 1932 |
| 2,436,743 | Carlson | Feb. 24, 1948 |
| 2,514,880 | Leatherman | July 11, 1950 |
| 2,725,911 | Glenn | Dec. 6, 1955 |

FOREIGN PATENTS

| | | |
|---|---|---|
| 554,750 | France | Mar. 8, 1923 |
| 249,187 | Switzerland | Mar. 16, 1948 |